Patented Sept. 17, 1940

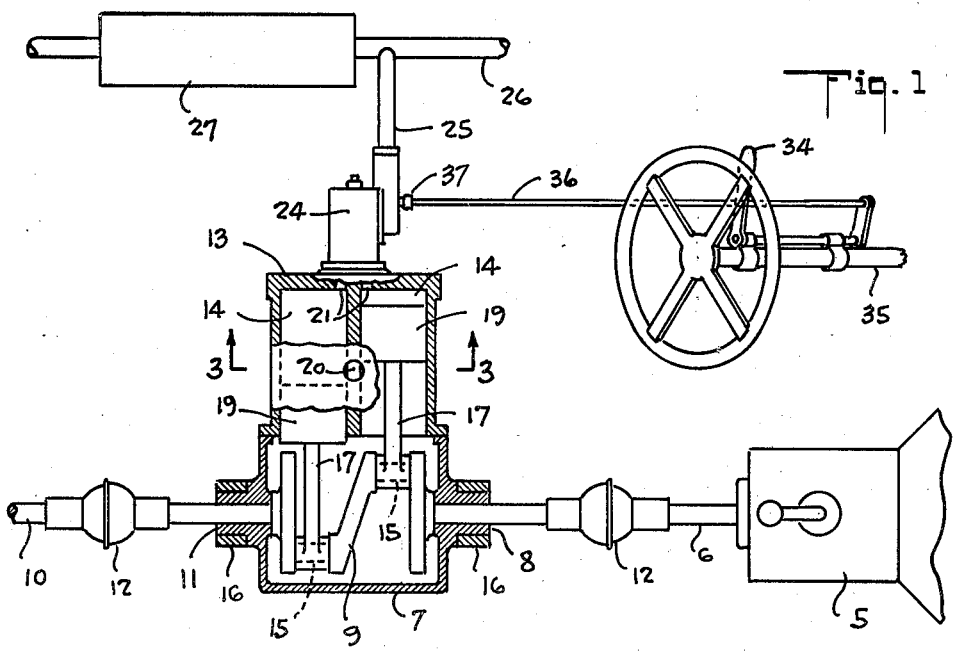

2,215,058

UNITED STATES PATENT OFFICE 2,215,058

VEHICLE BRAKE

Roy Van Maren, Bakersfield, Calif.

Application March 28, 1938, Serial No. 198,436

6 Claims. (Cl. 188—99)

This invention relates to vehicle brakes of the class adapted to utilize, in combination, the resistance to compression of fluid and of resilient means.

A grave disadvantage common to conventional forms of friction brakes which are controlled directly by lever mechanism, is found in the difficulty of obtaining an equal distribution of energy to the individual wheels of a vehicle with which it is employed, and in the tendency of such mechanism to work out of proper adjustment and lock, with the consequent loss of braking efficiency. Efforts to minimize these disadvantages are evidenced by conventional hydraulic or air brakes in which fluid is utilized as a cushioning agency between the operator's control medium and the brake proper. In most of such devices, however, the actual braking effect is usually attained by friction of a shoe band on a rotating drum connected to the wheel with the attending disadvantages of excessive cost of manufacture, assembly, and servicing, as well as in operation, due to the danger of premature locking.

A principal object of the present invention is to provide a brake structure for the drive shaft of an automobile to restrain rotation of the wheels geared thereto which is adapted for operation by compression of fluid, the degree of maximum compression permitted being controlled by resilient means.

Another object is the provision of a drive shaft having incorporated therewith a crank shaft for the reciprocation of a plurality of pistons disposed in respective cylinders for the compression of fluid therein, the resistance of said fluid to compression being operable to retard rotation of said shafts.

Another object is to provide means in a device of the character above alluded to for resiliently controlling the fluid braking pressure in said cylinders, comprising a spring whereby said pressure may be altered by proportionate and corresponding variances in compression of the spring effected by manually actuated mechanism.

Other objects and corresponding advantages such as positive operation, simplicity of construction, ease of assembly or installation, minimum servicing costs, and durability, will be obvious to those of skill in the art from an examination of the following description read in the light of the accompanying drawing, in which:

Fig. 1 is a view in section and elevation of my invention operatively associated with other parts of a vehicle, shown schematically, upon which it may be employed;

Fig. 2 is a sectional view of the valve mechanism for controlling the pressure in the cylinders;

Fig. 3 is a sectional view taken on lines 3—3 of Fig. 1.

Referring to the drawing in detail, the numerals of which indicate similar parts through out the several views, 5 designates generally a conventional transmission housing of an automobile having connected therewith a drive shaft 6 which extends into a crank case 7 through a fluid tight bearing 8 provided in one wall of the case. Within the crank case 7 and connected with the end of said drive shaft 6 so as to rotate therewith is secured a 180° crank shaft 9. The opposite end of the crank shaft is connected in axial alignment with a drive shaft continuation 10 journalled in a bearing 11 in the crank case 7. The drive shaft continuation is connected at its opposite end to the usual differential mechanism (not shown). Intermediate the ends of drive shaft 6 and the continuation 10 thereof, universal joints 12 are provided to offset the effect of any slight misalignment of the shafts with respect to each other and with the bearings 8 and 11. Mounted on the upper open end of the crank case 7 is a cylinder block 13 having a plurality of cylinder bores 14 axially aligned with respective crank shaft bearing pins 15.

Crank case 7 and cylinder block 13 may be suspended from the frame of the vehicle in proper alignment by means of hangers or other common expedients (not shown) secured to circular hollow bosses 16 mounted on bearings 8 and 11 respectively. Connecting rods 17 journalled on each crank shaft bearing pin 15 are pivoted, respectively, to piston pins 18 (Fig. 3) of aligned pistons 19, slidably disposed in respective cylinder bores 14. It will be understood that while the embodiment shown is provided with but two pistons, any number of cylinders may be utilized, the exact number and cross-sectional area thereof being determinable by those of skill in the art to comply with specific requirements.

Air is admitted into the two cylinders 14 through an inlet port 20 in the cylinder block opening into each cylinder intermediate its ends. Pressure in the cylinders is relieved through ports 21 located in the upper end of the block adjacent the portion of the block forming the division between the cylinders, whereby the ports will be in close proximity for control by a single valve 23, about to be described. A valve housing 24 is mounted on block 13 in a position inclosing the ports 21. Housing 24 is connected by conduit 25 to the exhaust pipe 26 of the vehicle engine (not shown), preferably intermediate the engine and the muffler 27.

Valve 23 is secured within housing 24 on the end of a valve stem 28 which extends reciprocably through a guide 29 formed in the wall of the valve housing. A spring 30 encircling the stem is adapted to seat on the valve. On the stem above the spring, a washer 31 is provided. Thus the position of the washer on the stem will determine the degree of compression of the spring as well as the resistance offered by the valve 23, on which the spring seats, to displacement by a balance of pressure within either of the cylinders.

In order to vary the compression of spring 30, a pedal or a lever 34 is provided in the operator's compartment of the vehicle as, for example, on the steering post 35. The lever 34 is connected to a rod 36 which extends through a grease-packed bearing 37 in the wall of valve housing 24 by a series of connecting arms (not shown). The structural requirements and arrangement of the connecting arms to provide for the reciprocation of the rod 36 through its bearing 37 in the valve housing upon corresponding movement of lever 34 in the operator's compartment, will be within the skill of those in the art.

The end of rod 36 within the housing is turned at right angles as at 38 and extends into a slot 41 formed in one arm 39 of a bell crank 40 for its slidable engagement therewith. Bell crank 40 is fulcrumed on a pivot 42 at the apex of its angle in opposite walls of the valve housing 24 in a position with the end of arm 43 of the crank extending to above washer 31. The end of arm 43 is formed with upper and lower cam surfaces 44 and 45, respectively, the lower cam being adapted to bear against washer 31 on which it is held by means of a pin 46 secured to the valve stem above arm 43 so as to engage the upper cam surface 44 of the bell crank.

The operation of my invention is briefly described as follows: Rotation of the crank shaft 9 causes the reciprocation of the pistons 19 in their respective cylinders. Upon the downward stroke of each piston, suction will be created in respective cylinders which will be alleviated by the ingress of air therein through ports 21 while valve 23 is open, as later described, and through port 20 when the piston passes the same.

To release the brake and permit unrestrained movement of the vehicle, the bell crank 40 is turned on its pivot to raise the valve from its seat by elevation of the cam 44 which impels corresponding movement of the pin 46 and stem 28. The crank may be moved to and held in this position by the lever 34, as will be obvious to those of skill in the art. Thus, air drawn into the cylinders will be freely expelled through ports 21 and there will be no appreciable resistance to the reciprocation of the pistons and the rotation of the drive shaft. When it is desired to apply the brake, the lever 34 is actuated to cause the movement of the rod 36 further into the valve housing 24 and lower the cam 45 to compress the spring and thereby close the valve. Air trapped within the cylinders above the pistons will afford a cushioned resistance to compression incident to the upward movement of the respective pistons which will be communicated to the drive shaft and wheels of the vehicle geared therewith through connecting rods 17 and crank shaft 9. It will be observed that when the pressure in the cylinders becomes greater than the resistance offered by the spring that valve 23 will open, to equalize pressures against opposite sides of the valve; and that the degree of braking action required may be varied by altering the position of the lever 34, controlling the compression of the spring.

While I have described but one embodiment of my invention, it will be understood that numerous changes may be made in size, design, proportion, number and shape of the various parts without departing from the spirit of my invention as defined by the appended claims.

What I claim and desire to secure by Letters Patent is:

1. In a device of the character described, a vehicle drive shaft, a crank shaft connected to said drive shaft so as to turn therewith, a pair of cylinders, a piston in each of said cylinders connected to said crank shaft, conduit means from said cylinders for the release of pressure therein, valve means closing said conduit means, resilient means urging said valve means to closed position against the urge of fluid under pressure within said cylinders, and a pivoted arm movable against said resilient means to vary the degree of compression of said resilient means.

2. In a device of the character described, a crank case comprising a pair of cylinders and a piston in each of said cylinders, a vehicle drive shaft, a crank shaft connected to said drive shaft, means to connect each of said pistons to said crank shaft, said cylinders having a pair of ports therein for the release of pressure in said cylinders, valve means for said ports, spring means holding said valve means closed against the urge of fluid under pressure in said cylinders, and lever mechanism to selectively increase or decrease the urge of said spring means to vary the maximum pressure created in said cylinders.

3. In a device of the character described, a drive shaft, a pump comprising a pair of cylinders and a piston in each cylinder, means connecting said pistons with said shaft and in staggered relation with respect to one another whereby rotation of said shaft will reciprocate said pistons in said cylinders, and alternately compress fluid within said cylinders, respectively, said cylinders each having an exit opening therein for emission of fluid, a valve seat encircling said exit ports, valve means adapted to seat on said valve seat for controlling said exit ports, resilient means at the side of the valve means opposite to the side thereof at which the valve seat is located bearing against said valve means to resist opening movement of said valve means, and a lever to vary the pressure of said resilient means on said valve means.

4. In a brake for an automotive device having an exhaust pipe leading from an internal combustion engine, a muffler intermediate the ends of said exhaust pipe, a drive shaft, a cylinder and a piston in said cylinder forming a compression chamber, means connecting said piston and drive shaft whereby rotation of said drive shaft will reciprocate said piston in said cylinder, said cylinder having an inlet port therein at one end of said compression chamber and an exit opening adjacent the opposite end of said chamber, said piston normally closing communication between said inlet and exit ports but being adapted on its non-compression stroke to open communication between said ports, and means communicating said exit opening with said exhaust pipe intermediate the engine and muffler.

5. In a brake, a drive shaft, a cylinder and a piston in said cylinder forming a compression chamber, means connecting said piston and drive shaft whereby rotation of said drive shaft will reciprocate said piston in said cylinder, said cylinder having an inlet port therein at one end of said compression chamber and an exit opening adjacent the opposite end of said chamber, said piston closing communication between said inlet and exit ports during a portion of each stroke of the piston but being movable on its non-compression stroke to open communication between said ports, valve means controlling said exit port, resilient means resisting displacement of said valve means from said exit port, and a lever to vary compression of said resilient means and thereby vary the amount of resistance of said resilient means to displacement of said valve means.

6. In a brake, a drive shaft, a cylinder and a piston in said cylinder forming a compression chamber, means connecting said piston and drive shaft whereby rotation of said drive shaft will reciprocate said piston in said cylinder, said cylinder havign an inlet port therein at one end of said compression chamber and an exit opening adjacent the opposite end of said chamber, said piston closing communication between said inlet and exit ports during a portion of each stroke of the piston but being movable on its non-compression stroke to open communication between said ports, valve means controlling said exit port, a spiral spring bearing against said valve means to resist by its compression the opening movement of said valve means, a bell crank having one end thereof bearing against the end of said spring opposite to the end thereof engaging said valve means, and a rod to tilt said bell crank and thereby actuate said crank to compress said spring.

ROY VAN MAREN.